(12) United States Patent
Satyavolu et al.

(10) Patent No.: US 11,174,443 B2
(45) Date of Patent: Nov. 16, 2021

(54) TORREFIED BIOMASS BRIQUETTES AND RELATED METHODS

(71) Applicant: University of Louisville Research Foundation, Inc., Louisville, KY (US)

(72) Inventors: Jagannadh Satyavolu, Louisville, KY (US); Osama Bu Aamiri, Louisville, KY (US); Chamila Rajeeva Thilakaratne, Louisville, KY (US)

(73) Assignee: University of Louisville Research Foundation, Inc., Louisville, KY (US)

( * ) Notice: Subject to any disclaimer, the term of this patent is extended or adjusted under 35 U.S.C. 154(b) by 0 days.

(21) Appl. No.: 16/771,795

(22) PCT Filed: Dec. 12, 2018

(86) PCT No.: PCT/US2018/065145
§ 371 (c)(1),
(2) Date: Jun. 11, 2020

(87) PCT Pub. No.: WO2019/118565
PCT Pub. Date: Jun. 20, 2019

(65) Prior Publication Data
US 2021/0071099 A1    Mar. 11, 2021

Related U.S. Application Data

(60) Provisional application No. 62/597,542, filed on Dec. 12, 2017.

(51) Int. Cl.
*C10L 5/36* (2006.01)
*C10L 9/08* (2006.01)
(Continued)

(52) U.S. Cl.
CPC .............. *C10L 5/442* (2013.01); *C10B 49/00* (2013.01); *C10B 53/08* (2013.01); *C10B 57/00* (2013.01);
(Continued)

(58) Field of Classification Search
None
See application file for complete search history.

(56) References Cited

U.S. PATENT DOCUMENTS 10,093,953 B2    10/2018   Gordon et al.
10,221,359 B2 *   3/2019   Phan ...................... C10B 41/00
(Continued)

FOREIGN PATENT DOCUMENTS

WO    WO-2010071440 A1 *  6/2010  ................ C10L 9/08
WO    WO-2012060961 A1 *  5/2012  ............. C10G 11/18
(Continued)

OTHER PUBLICATIONS

Written Opinion of International Searching Authority PCT US 2018/065145 (8 pages) (Year: 2020).*
(Continued)

*Primary Examiner* — Pamela H Weiss
(74) *Attorney, Agent, or Firm* — Jenkins, Wilson, Taylor & Hunt, P.A.

(57) ABSTRACT

The presently disclosed subject matter relates to torrefied biomass briquettes and methods for producing the same that make use of a mixture of lightly torrefied material (LTM) and highly torrefied material (HTM) and/or make use of torrefied materials that are subjected to a hydrolysis pretreatment prior to being torrefied.

14 Claims, 3 Drawing Sheets

(51) Int. Cl.
  *C10B 49/00* (2006.01)
  *C10B 57/00* (2006.01)
  *C10B 53/00* (2006.01)
  *C10L 5/44* (2006.01)
  *C10B 53/08* (2006.01)

(52) U.S. Cl.
  CPC ............... *C10L 5/361* (2013.01); *C10L 9/083* (2013.01); *C10L 2200/0469* (2013.01); *C10L 2290/08* (2013.01); *C10L 2290/24* (2013.01); *C10L 2290/30* (2013.01)

(56) References Cited

U.S. PATENT DOCUMENTS

| | | | | |
|---|---|---|---|---|
| 2003/0221363 | A1* | 12/2003 | Reed | C10L 5/363 44/594 |
| 2009/0151253 | A1* | 6/2009 | Manzer | C10L 9/083 48/62 R |
| 2012/0110896 | A1* | 5/2012 | Coronella | C10L 9/086 44/307 |
| 2012/0266530 | A1* | 10/2012 | Ellis | C10L 9/10 44/500 |
| 2013/0067806 | A1* | 3/2013 | Brock | C10L 5/44 44/589 |
| 2013/0295628 | A1* | 11/2013 | Retsina | C08H 8/00 435/160 |
| 2014/0082998 | A1* | 3/2014 | Brock | C10L 5/363 44/589 |
| 2014/0150334 | A1 | 6/2014 | Retsina et al. | |
| 2014/0262727 | A1* | 9/2014 | Felix | B29C 48/67 201/30 |
| 2015/0004654 | A1* | 1/2015 | Retsina | C10L 5/445 435/99 |
| 2015/0203774 | A1* | 7/2015 | Lake | C10L 5/447 44/564 |
| 2015/0275115 | A1* | 10/2015 | Sethi | C10B 49/10 44/590 |
| 2016/0002554 | A1* | 1/2016 | Tumuluru | C10L 5/445 44/589 |
| 2016/0068758 | A1* | 3/2016 | Linck | C10G 47/02 585/242 |
| 2016/0297845 | A1 | 10/2016 | Satyavolu et al. | |
| 2017/0029733 | A1* | 2/2017 | Felix | B29C 48/67 |

FOREIGN PATENT DOCUMENTS

| | | | | |
|---|---|---|---|---|
| WO | WO-2012074388 | A1 * | 6/2012 | ............. C10L 5/44 |
| WO | WO-2017025511 | A1 * | 2/2017 | ............. C10L 5/442 |
| WO | WO-2019118565 | A1 * | 6/2019 | ............. C10L 5/14 |

OTHER PUBLICATIONS

Current Trends in the Production Applications of Torrefied Wood/Biomass a Review bioresourses .com Eseyin et al (2015) Torrefaction Trends Bioresources 10(4) 8812-8858 (Year: 2015).*
Wood Torrefaction Pilot Tests and Utilisation Prospects Carl Wilen Perttu Jukola Timo Jarvinen and Kai Sipila VTT VTT Technology 122 (80 pgs) (Year: 2013).*
Anukam, A., et al., "An investigation into the impact of reaction temperature on various parameters during torrefaction of sugarcane bagasse relevant to gasification", Journal of Chemistry, vol. 2015, article 235163, 12 pgs.
Bhagwanrao, S.V., et al., "Bulk density of biomass and particle density of their briquettes", Int. J. Agricultural Eng., Issue 1, 7:221-224 (2014) (abstract).
Bridgeman, T.G., et al., "Torrefaction of reed canary grass, wheat straw and willow to enhance solid fuel qualities and combustion properties", Fuel 87:844-856 (2008).
Nanou, P., et al., "The role of lignin in the densification of torrefied wood in relation to the final product properties", Biomass and Bioenergy pp. 1-15 (2017).
Tumuluru, J.S., et al., "Impact of process conditions on the density and durability of wheat, oat, canola, and barley straw briquettes", Bioenergy Research 8:388-401 (2015).
Yaman, S., "Pyrolysis of biomass to produce fuels and chemical feedstocks", Energy Conversion and Management 45(5):651-671 (2004).
Araújo, S., et al., "Effect of a mild torrefaction for production of eucalypt wood briquettes under different compression pressures", Biomass and Bioenergy 90:181-186 (2016).
Asadullah, M., et al., "Optimization of palm kernel shell torrefaction to produce energy densified bio-coal", Energy Conversion and Management 88:1086-1093 (2014).
Bazargan, A., et al., "Compaction of palm kernel shell biochars for application as solid fuel", Biomass and Bioenergy 70:489-497 (2014).
Brown, T.R., et al., "Techno-economic analysis of biomass to transportation fuels and electricity via fast pyrolysis and hydroprocessing", Fuel 106:463-469 (2013).
Chen, W.H., et al., "A state-of-the-art review of biomass torrefaction, densification and applications", Renewable and Sustainable Energy Reviews 44:847-866 (2015).
Demirbas, A., "Biomass resource facilities and biomass conversion processing for fuels and chemicals", Energy Conversion and Management 42(11):1357-1378 (2001).
Detels, R., et al., "The UCLA population studies of Cord: X. A cohort study of changes in respiratory function associated with chronic exposure to Sox, NOx, and hydrocarbons", American Journal of Public Health 81:350-359 (1991).
Fonseca, D.A., et al., "Towards integrated biorefinery from dried distillers grains: Selective extraction of pentoses using dilute acid hydrolysis", Biomass and Bioenergy 71:178-186 (2014).
Ghiasi, B., et al., "Densified biocoal from woodchips: Is it better to do torrefaction before or after densification?", Applied Energy 134:133-142 (2014).
Gori, S.S., et al., "Isolation of C5-sugars from hemicellulose-rich hydrolysate of distillers dried grains", ACS Sustainable Chemistry & Engineering 3(10):2452-2457 (2015).
Guo, L., et al., "Compression and relaxation properties of selected biomass for briquetting", Biosystems Engineering 148:101-110 (2016).
Hu, Q., et al., "Effects of binders on the properties of bio-char pellets", Applied Energy 157:508-516 (2015).
International Preliminary Report on Patentability corresponding to International Patent Application No. PCT/US2018/065145 dated Jun. 25, 2020.
ISO 15210: Solid biofuels—Determination of mechanical durability of pellets and briquettes.
IUPAC-IUB Commission on Biochemical Nomenclature, Biochem 11 (9):1726-1732 (1972).
Järvinen, T., et al., "Experimentally determined storage and handling properties of fuel pellets made from torrefied whole-tree pine chips, logging residues and beech stem wood", Fuel, 129:330-339 (2014).
Kaliyan, N., et al., "Factors affecting strength and durability of densified biomass products", Biomass and Bioenergy 33:337-359 (2009).
Kaliyan, N., et al., "Natural binders and solid bridge type binding mechanisms in briquettes and pellets made from corn stover and switchgrass", Bioresource Technology 101:1082-1090 (2010).
Kong, L., et al., "Conversion of recycled sawdust into high HHV and low NOx emission bio-char pellets using lignin and calcium hydroxide blended binders", Renewable Energy 60:559-565 (2013).
Larsson, S.H., et al., "Effects of moisture content, torrefaction temperature and die temperature in pilot scale pelletizing of torrefied Norway spruce", Applied Energy 102:827-832 (2013).
Li, H., et al., Pelletization of torrefied sawdust and properties of torrefied pellets, Applied Energy 93:680-685 (2012).
Peng, J., et al., "Sawdust as an effective binder for making torrefied pellets", Applied Energy 157:491-498 (2015).
Peng, J., et al., "Effects of thermal treatment on energy density and hardness of torrefied wood pellets", Fuel Processing Technology 129:168-173 (2015).

(56) References Cited

OTHER PUBLICATIONS

Peng, J.H., et al., "Torrefaction and densification of different species of softwood residues", Fuel 111:411-421 (2013).
Raveendran, K., et al., et al., "Heating value of biomass and biomass pyrolysis products", Fuel 75(15):1715-1720 (1996).
Searcy, E.M., et al., Uniform-Format Feedstock Supply System: A Commodity-Scale Design to Produce an Infrastructure-Compatible Biocrude from Lignocellulosic Biomass; INL/EXT-10-20372; Idaho National Laboratory, USA (2010).
Solomon, S., et al., Climate change 2007—The physical science basis: Working group I contribution to the fourth assessment report of the IPCC. Cambridge University Press vol. 4 (2007).
Tag, A.T., et al., "Effects of feedstock type of pyrolysis temperature on potential applications of biochar", Journal of Analytical and Applied Pyrolysis, 120:200-206 (2016).
Teixeira, S.R., et al., "Briquetting of charcoal from sugar-cane bagasse fly ash (scbfa) as an alternative fuel", Waste Management 30:804-807 (2010).
Temmerman, M., et al., "Comparative study of durability test methods for pellets and briquettes", Biomass and Bioenergy 30:964-972 (2006).
Wang, C., et al., "Oxidative torrefaction of biomass residues and densification of sawdust to pellets", Bioresource Technology, 127:318-325 (2013).
Yang, Z., et al., "Effects of torrefaction and densification on switchgrass pyrolysis products", Bioresource Technology 174:266-273 (2014).
Zhong, Q., et al., "Coal tar pitch and molasses blended binder for production of formed coal briquettes from high volatile coal", Fuel Processing Technology 157:12-19 (2017).

\* cited by examiner

TORREFIED BIOMASS BRIQUETTES AND RELATED METHODS

CROSS REFERENCE TO RELATED APPLICATIONS

This application is a national stage filing of PCT International Application No. PCT/US2018/065145, filed Dec. 12, 2018, incorporated herein by reference in its entirety, which is based on and claims priority to U.S. Provisional Application Ser. No. 62/597,542, filed Dec. 12, 2017, the disclosure of which is incorporated herein by reference in its entirety.

TECHNICAL FIELD

The presently disclosed subject matter generally relates to torrefied biomass densification and related methods. In particular, certain embodiments of the presently disclosed subject matter relate to torrefied biomass briquettes and methods for producing the same that make use of a mixture of lightly torrefied material (LTM) and highly torrefied material (HTM) and/or make use of torrefied materials that are subjected to a hydrolysis pretreatment prior to being torrefied.

BACKGROUND

Coal has historically been the staple fuel for power generation in the United States due to its abundance, high heating value, and relatively low processing costs. Until recently, approximately 40% of all power generated in the United States was produced by coal and the recent decline has been attributed to the lowering cost of natural gas and environmental regulations. These regulations have typically been strict on coal due to its chemical composition and tendency to release harmful products into the environment including sulfur, mercury, NOx, SOx, and greenhouse gases ($CO$, $CO_2$, and the like). These and the particulate matter released from coal smoke have been detrimental to the health of human and animal populations in areas by instigating high levels of smog and ultrafine particulate matter. Mining also negatively impacts the health of those involved with its processing. Black lung disease, among other respiratory complications, has lowered the average life expectancy in coal miners due to the constant exposure to coal dust and mining conditions. Mining is also a leading contributor to environmental destruction, causing soil erosion and ecosystem damage that prevents plants and animals from prospering in affected areas even when the mines are sealed. In order to help combat the detrimental effects of coal, alternatives must be found that ensure a secure and healthy energy future.

Instead of a positive net carbon production, carbon dioxide resulting from burning biomass is taken back in by the plants that are cultivated for future use as fuel. Using biomass also eliminates sulfur and mercury exposure due to the lack of said chemicals in plant matter. However, energy density of biomass compared to that of coal is considerably lower, approximately 37 MJ/kg for anthracite coal to 17-21 MJ/kg for biomass (on a dry basis). This results in larger, and therefore costlier, power plant operations. Biomass also tends to have a low physical density and high moisture content, making the volumes needed to power homes and cities increase dramatically compared to that of coal. Movement of these large volumes from farm to power plant creates an economic disadvantage as transportation costs increase proportionally with said volume increases. In addition, power plants would need to be re-tooled to effectively burn the biomass as grinding efficiency of the material, durability of the fibers, and the tendency of biomass to hold onto water all impact the heating value and processing methods. In addition, biomass can contain ash that can lead to scaling and is problematic in combustion units in a power generation plant.

Thus, biomass is a renewable fuel that has the potential to play a significant role as a source of renewable energy. However, its usage is limited due to poor characteristics of low energy density and low hydrophobicity that creates problems especially in handling and storage as compared to coal, which is still the dominant solid fuel in electricity and heat generation. Technologies (such as biomass torrefaction) have thus been investigated to pre-treat or upgrade biomass, in an effort to overcome its limitations and raise its potential as a substitute to coal.

After torrefaction, the biomass loses its binding ability. Hence, a challenge of torrefaction is to be able to maintain the binding ability for densification of the torrefied biomass. Densification of torrefied biomass into briquettes would help reduce the challenges associated with shipping, storage and handling at coal fired power plants. Currently, the densification typically requires the use of an external binder to make the briquettes hydrophobic, durable and transportable. However, the binders and the associated infrastructure for the binders add significantly to the production costs of torrefied briquettes. Hence, there is a need to eliminate the use of binders such that the production cost of briquettes is reduced while maintaining the hydrophobicity, durability and transportability of the briquettes. There is also a need to enhance the overall economic viability of using torrefied biomass to produce a coal alternative.

SUMMARY

This summary lists several embodiments of the presently disclosed subject matter, and in many cases lists variations and permutations of these embodiments. This summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently disclosed subject matter, whether listed in this summary or not. To avoid excessive repetition, this Summary does not list or suggest all possible combinations of such features.

A torrefied biomass briquette is provided in accordance with the presently disclosed subject matter. In some embodiments, the torrefied biomass briquette comprises: (a) about 10% to about 95% of a highly-torrefied material (HTM) and about 5% to about 90% of a lightly torrefied material (LTM); (b) a torrefied acid hydrolyzed biomass having a FTIR profile comprising one or more reduced oxygen functionalities as compared to biomass not subjected to acid hydrolysis; or (c) a combination of (a) and (b). In some embodiments, prior to densification, the HTM and the LTM have a combined moisture content of about 7% to about 15%. In some embodiments, subsequent to densification, the briquette has a moisture content of about 3% to about 10%.

In some embodiments, the briquette exhibits lignin based in-situ binding and is free of an added binder. In some embodiments, the briquette has a density in the range of about 1 to about 1.5 gm/cm$^3$. In some embodiments, the briquette has a durability index value of about 5% to more than about 93%. In some embodiments, the hydrophobicity of the briquette is increased relative to a briquette including only LTM. In some embodiments, the briquette has a calorific value of about 8,000 BTU/lb to about 10,000 BTU/lb.

A method of producing a torrefied biomass briquette is provided in accordance with the presently disclosed subject matter. In some embodiments the method comprises producing a mixture comprising about 10% to about 95% of a highly-torrefied material (HTM) and about 5% to about 90% of a lightly torrefied material (LTM); preheating the mixture to a predetermined temperature; and compressing and simultaneously heating the mixture. In some embodiments, prior to the compressing and heating, the HTM and the LTM have a combined moisture content of about 7% to about 15%. In some embodiments, subsequent to the compressing and heating, the briquette has a moisture content of about 3% to about 10%.

In some embodiments, the mixture is pre-heated to a temperature of about 40° C. to about 80° C. In some embodiments, the method further comprises adjusting the moisture content of the mixture prior to compression. In some embodiments, heating the mixture comprises heating the mixture in a die to a temperature of about 200° C. to about 250° C. In some embodiments, the mixture does not include a binder. In some embodiments, the LTM and/or the HTM of the mixture is formed by providing a biomass; and subjecting that biomass to an acid hydrolysis.

In some embodiments, a torrefied biomass briquette produced by the method is provided.

A method of producing a torrefied biomass is provided in accordance with the presently disclosed subject matter. In some embodiments, the method comprises: providing an amount of a biomass; subjecting the biomass to an acid hydrolysis to produce a hydrolyzed biomass; and torrefying the hydrolyzed biomass. In some embodiments, the biomass comprises wood.

In some embodiments, the method further comprises drying the biomass prior to torrefying the hydrolyzed biomass.

In some embodiments, a portion of the hydrolyzed biomass is subjected to torrefaction at a temperature ranging from about 160° C. to about 220° C. and/or a portion of the hydrolyzed material is torrefied at temperatures above about 240° C.

In some embodiments, the method further comprises compressing the hydrolyzed biomass; and simultaneously heating the hydrolyzed biomass at a predetermined temperature to form a torrefied biomass briquette.

In some embodiments, a torrefied biomass produced by the method is provided. In some embodiments, a torrefied biomass briquette produced by the method is provided.

Thus, it is an object of the presently disclosed subject matter to provide torrefied biomass briquettes and related methods.

An object of the presently disclosed subject matter having been stated hereinabove, and which is achieved in whole or in part by the presently disclosed subject matter, other objects will become evident as the description proceeds when taken in connection with the accompanying Figures as best described herein below.

DETAILED DESCRIPTION

Figure 1:
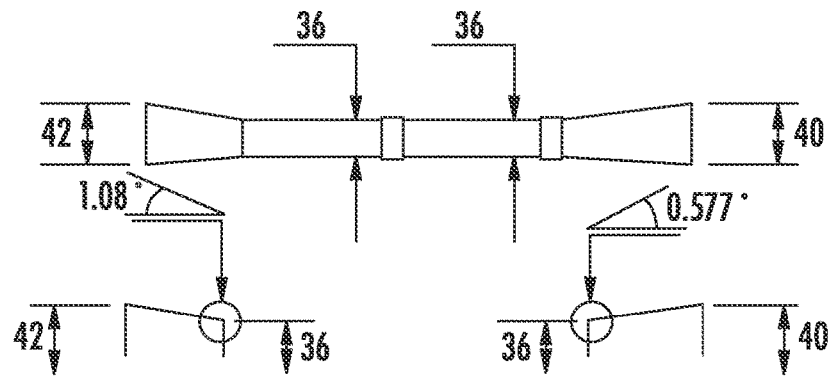
FIG. 1 is a schematic of a die (diameter in mm) used in representative approaches for making briquettes in accordance with the presently disclosed subject matter. The used die configurations are (42-36)(36-36)(36-36)(36-40) and (42-34)(34-34)(34-34)(34-40).

The details of one or more embodiments of the presently-disclosed subject matter are set forth in this document. Modifications to embodiments described in this document, and other embodiments, will be evident to those of ordinary skill in the art after a study of the information provided in this document. The information provided in this document, and particularly the specific details of the described exemplary embodiments, is provided primarily for clearness of understanding and no unnecessary limitations are to be understood there from. In case of conflict, the specification of this document, including definitions, will control.

While the terms used herein are believed to be well understood by those of ordinary skill in the art, certain definitions are set forth to facilitate explanation of the presently-disclosed subject matter.

Unless defined otherwise, all technical and scientific terms used herein have the same meaning as is commonly understood by one of skill in the art to which the invention(s) belong.

All patents, patent applications, published applications and publications, databases, websites and other published materials referred to throughout the entire disclosure herein, unless noted otherwise, are incorporated by reference in their entirety.

Where reference is made to a URL or other such identifier or address, it understood that such identifiers can change and particular information on the internet can come and go, but equivalent information can be found by searching the internet. Reference thereto evidences the availability and public dissemination of such information.

As used herein, the abbreviations for any protective groups, amino acids and other compounds, are, unless indicated otherwise, in accord with their common usage, recognized abbreviations, or the IUPAC-IUB Commission on Biochemical Nomenclature (see, Biochem. (1972) 11(9): 1726-1732).

Although any methods, devices, and materials similar or equivalent to those described herein can be used in the practice or testing of the presently-disclosed subject matter, representative methods, devices, and materials are described herein.

The present application can "comprise" (open ended), "consist of" (closed), or "consist essentially of" the components of the present invention as well as other ingredients or elements described herein. As used herein, "comprising" is open ended and means the elements recited, or their equivalent in structure or function, plus any other element or elements which are not recited. The terms "having" and "including" are also to be construed as open ended unless the context suggests otherwise.

Following long-standing patent law convention, the terms "a", "an", and "the" refer to "one or more" when used in this application, including the claims. Thus, for example, reference to "a cell" includes a plurality of such cells, and so forth.

Unless otherwise indicated, all numbers expressing quantities of ingredients, properties such as reaction conditions, and so forth used in the specification and claims are to be understood as being modified in all instances by the term "about". Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, "optional" or "optionally" means that the subsequently described event or circumstance does or does not occur and that the description includes instances where said event or circumstance occurs and instances where it does not. For example, an optionally variant portion means that the portion is variant or non-variant.

GENERAL CONSIDERATIONS

Biomass includes the waste materials of agriculture, forestry, and different other sources, which have low-value and limited use with high disposal costs. But, biomass is the fuel that has the potential to play a significant role as a source of renewable energy. Instead of a positive net carbon production, carbon dioxide resulting from burning biomass is taken back in by the plants that are cultivated for future use as fuel. But, usage of biomass is limited due to poor characteristics of low energy density, durability (handling and transportation), hydrophobicity, storage, and others.

An objective has been to develop a "drop-in" biomass derived coal that performs similar to coal and can be integrated in to the existing coal infrastructure of the coal fired power plants either replacing or substituting for coal. While this kind of bio-coal production is a natural fit from an environmental and health standpoint, the economics behind it still cannot overcome the cost-effectiveness of coal. One major road block to the implementation of biomass derived coal is its high cost compared to traditional coal. Depending on the cost of biomass, the production cost of biomass derived coal ranges between $200-$250 per ton (compared to $50-$80 per ton of coal). Currently, woody biomass with about 50% moisture content costs approximately $80/MT. It therefore presents economic challenges for this bio-coal to be used at current prices (even with carbon credits) for power generation. Taking advantage of compounds in the biomass structure before torrefaction could help improve economics by creating co-products that could provide additional profit to mitigate the higher production costs. Hemicellulose is a large component of most biomass species and is destroyed in the torrefaction process. Hemicellulose can be extracted and recovered as high-value xylose in large quantities at a fairly minimum monetary and energy cost.

Torrefaction is a thermal treatment process carried out in a chemically inert environment to improve hydrophobicity and energy content of biomass. The resulting product appears as energy densified brown to black solid, and the characteristics obtained after torrefaction can depend on process conditions, such as temperature, time of torrefaction, and type of feedstock as well as the type of torrefaction equipment employed. At high or severe torrefaction, the energy density of the fuel is increased to a great extent.

Several challenges arise after torrefaction of biomass materials, such as poor density and high amount of dust formation during handling. These challenges need to be addressed for the commercial use of torrefied material. In order to make use of torrefied biomass commercially, the material should be densified. Densification is the process of compaction of torrefied materials or biomass residues into a product of higher density than the original raw material. Such a conversion has many potential advantages, including increasing calorific value per unit volume, increasing convenience of transportation and storage, reducing dust emissions, solving the problem of residue disposal, and making a uniform final product.

A challenge associated with the densification of torrefied biomass is the difficulty of getting a desirable quality (i.e., through density and durability) in densifying biomass particles after they have been torrefied. A reason is due to the chemical changes that happen to the biomass components, such as lignin, after torrefaction. During torrefaction (200-300° C.), lignin undergoes reactions of depolymerisation, demethoxylation, bond cleavage, and condensation, while hemicellulose will decompose and both will have an amount of reduction with the dehydration of the biomass. Hemicellulose is responsible for the existence of hydrogen bonding sites. Lignin mainly can produce covalent bonding when activated. These chemical changes play a role in not getting good binding leading to poor densification and in low durability for the torrefied biomass.

COMPOSITIONS AND METHODS

In some embodiments, the presently disclosed subject matter employs torrefaction and densification of biomass to create a coal substitute. This torrefaction and densification process provides several improvements to the biomass that address at least in part the issues discussed elsewhere herein. After torrefaction and densification, biomass product has higher calorific value and is hydrophobic and durable. Torrefaction helps to remove oxygenated functionalities of ligno-cellulose structure of the biomass, carbonizing it and creating a more hydrophobic and more energy dense material. This provides heating values closer to coal and allows storage without the fear of rotting or degradation. These characteristics subsequently aid in effective transportation of the resulting torrefied material. Torrefaction provides brittleness as well, allowing for torrefied material to be more easily ground and used in current coal plant infrastructures.

A challenge associated with the densification of torrefied biomass is the difficulty in getting the desirable binding, density and durability in densifying biomass particles after they have been torrefied. In some embodiments, the presently disclosed subject matter provides approaches for densifying a mixture of highly and lightly torrefied biomass with the object of using that lightly torrefied material as the main source of binding by enhancing their inherent natural lignin.

Torrefied biomass represents a high quality renewable energy source. Torrefaction pretreatment can be generally classified into light, mild, and high corresponding to temperatures of approximately 200-235° C., 235-275° C., and 275-300° C., respectively. Densification of torrefied biomass (for example, into briquettes) improves the logistics associated with bulk transportation, handling, and storage for heat and power applications. Two primary deliverables from densification are durability and hydrophobicity of the briquettes. The use of external binders and waxes to promote these attributes can be prohibitively expensive.

Hence, the utilization of lignin in-situ of the biomass to promote binding and hydrophobicity is provided in accordance with some embodiments of the presently disclosed subject matter. Lignin, a cross-linked thermoplastic polymer, tends to break down and lose its binding ability after the high temperature torrefaction of the biomass. In this regard, the presently disclosed subject matter is based, at least in part, on the development of an approach that utilizes a mixture of biomass torrefied at two different temperatures, such that one biomass component delivers native lignin for binding and the other delivers high carbon content for BTU content. The biomass delivering lignin—a lightly torrefied material LTM—is torrefied at a lower temperature range (160-220° C.) while the other biomass component—a highly torrefied material HTM—is torrefied at temperatures above 240° C. This mixture can then be densified, such as by using a ram type briquetter. The utilization of LTM to deliver thermally modified lignin (as opposed to using untorrefied biomass that can only deliver unmodified lignin) can help maintain the hydrophobicity and BTU value of the densified and torrefied material. In some embodiments, and as described further below, the particle size of the binder (LTM), mixture moisture content, temperature of the mixture, the ratio of LTM to HTM, and die configuration in the briquetter are modulated to deliver hydrophobic and highly durable briquettes with energy densities in the range of 8,000-10,000 BTU/lb.

The presently disclosed subject matter includes torrefied biomass briquettes and methods of forming such briquettes. In some embodiments, a torrefied biomass briquette is provided that comprises about 10% to about 95% of a highly-torrefied material (HTM) and about 5% to about 90% of a lightly torrefied material (LTM). In some embodiments, a torrefied biomass briquette is provided that comprises about 10%, about 20%, about 30%, about 40%, about 50%, about 60%, about 70%, about 80%, about 90%, or about 95% of a HTM. In some embodiments, a torrefied biomass briquette is provided that comprises about 5%, about 10%, about 20%, about 30%, about 40%, about 50%, about 60%, about 70%, about 80%, or about 90% of a LTM.

In some embodiments, the briquette has a FTIR profile comprising one or more reduced oxygen functionalities. In some embodiments, the briquette comprises a torrefied biomass and/or an acid hydrolyzed biomass (as binder) having a FTIR profile comprising one or more reduced oxygen functionalities as compared to biomass not subjected to acid hydrolysis. In some embodiments, the briquette exhibits lignin based in-situ binding and is free of an added binder. The in-situ lignin is provided to the HTM and LTM mixture through the LTM and/or is also provided through the acid hydrolyzed biomass. The briquetting method described in accordance with the presently disclosed subject matter allows the in-situ lignin to be entrained by the generated steam, distribute through the structure of the briquette, and promote bonding within the briquette.

The term "briquette" is used herein to refer to blocks of compressed biomass of the presently disclosed subject matter that are of a suitable size and shape for use as a fuel source. In this regard, the term "briquette" is typically used to refer to blocks having dimensions in the range of less than about 1 cm (and including 1 cm) to about 10 cm, but can be further inclusive of blocks having smaller or greater dimensions. In some embodiments, the term "briquette" is inclusive of torrefied pellets and the like as would be recognized by those skilled in the art.

With respect to the biomass utilized in accordance with the presently disclosed subject matter, the term "biomass" as used herein is used to refer to fuel derived from organic matter, including plant and animal matter. For example, in some embodiments of the presently disclosed subject matter, the biomass is wood. As another example, in some embodiments, the biomass is an agricultural biomass or, in other words, a biomass that is derived from agricultural sources including, but not limited to soy hulls from soybean processing, rice hulls from rice milling, corn fiber from wet milling or dry milling, bagasse from sugarcane processing, pulp from sugar beets processing, distillers grains, and the like.

In some embodiments, the presently disclosed subject matter provides a method of producing a torrefied biomass briquette. In some embodiments, the method comprises producing a mixture including about 10% to about 95% of a highly-torrefied material (HTM) and about 5% to about 90% of a lightly torrefied material (LTM); adjusting the moisture of the mixture, preheating the mixture to a predetermined temperature, and compressing and simultaneously heating the mixture.

Regardless of the particular source of biomass, and as indicated above, to produce a torrefied biomass briquette in accordance with some embodiments of the presently disclosed subject matter, a mixture of LTM and HTM is first produced and provided in which the HTM is in an amount of about 10% to about 95% and the LTM is an amount of about 5% to about 90%. In such a mixture, the materials comprising the LTM have previously undergone torrefaction at a lower temperature range (e.g., about 160° C. to about 220° C.), while the HTM has been torrefied at temperatures above about 240° C. In this regard, once combined, the LTM is configured to provide thermally-modified lignin for binding the briquette together and the HTM provides a material with an energy content higher than that found in the LTM and capable of providing an increased BTU value upon burning. In some embodiments, the method comprises an initial step of providing a biomass, such as those biomasses described above, and then subjecting that biomass to an acid hydrolysis as described herein below prior to treatment.

Upon mixing the LTM with the HTM in a desired ratio, such as those mentioned above, the moisture content of the mixture can be adjusted to a desired level. In some embodiments, the moisture content can be adjusted with the addition of water or steam. In some embodiments, by adjusting the moisture content of the starting material, a briquette can subsequently be produced having a desired durability, density, and or hydrophobicity, as described in further detail below. In some embodiments, prior to compressing the mixture while heating as described below, the HTM and the LTM mixture has a combined moisture content of about 7% to about 15%, such as, in some embodiments, a moisture content of about 5%, about 6%, about 7%, about 8%, about 9%, about 10%, about 11%, about 12%, about 13%, about 14%, about 15%. In some embodiments, the moisture content is about 8% to about 14%. Compressing the mixture can also be referred to as densifying the material or as densification of the material.

Subsequent to adjusting the moisture content, the mixture of HTM and LTM materials are then typically preheated to a temperature of about 40° C. to about 80° C. (e.g., about 50° C. by steam) before being fed into a die system where the materials in the mixture undergo compression while heating for a period of time to simulate a hydrothermal torrefaction during compression and heating of the biomass. The preheating can occur at a temperature of about 40° C., 45° C., 50° C., 55° C., 60° C., 65° C., 70° C., 75° C., or 80° C. By way of example not limitation, the method can comprise compressing the mixture at temperatures of about 200° C. to about 250° C. (e.g., about 200° C., 205° C., 210° C., 215° C., 220° C., 225° C., 230° C. 235° C., 240° C., 245° C., or 250° C.) to produce a briquette. In some embodiments, subsequent to the compressing while heating aspects of the procedure, the resulting briquettes have a moisture content of about 3% to about 10% after densification, including, in some embodiments, a moisture content of about 3%, about 4%, about 5%, about 6%, about 7%, about 8%, about 9%, or about 10%.

Through the simulated torrefaction during densification of a material including a mixture of LTM and HTM and by utilizing the adjusted moisture contents indicated above, in some embodiments, a torrefied product or material is produced having improved properties relative to materials produced with HTM or LTM alone or relative to other available torrefied biomass materials or products. For instance, in some embodiments, by making use of such materials and processes, a briquette is produced without the use of binder (i.e., a binding agent) that is typically required to produce torrefied biomass briquette of sufficient quality. In some embodiments, the resulting briquette has an increase in density, a durability index value of about 50% to more than about 93%, an increase in hydrophobicity relative to briquette including only LTM, and/or a calorific value of about 8,000 BTU/lb to about 10,000 BTU/lb, including about 9,000 BTU/lb.

In some embodiments, the briquette has a density in the range of about 1 to about 1.5 gm/cm$^3$, including a density of about 1.053 gm/cm$^3$, about 1.1 gm/cm$^3$, about 1.2 gm/cm$^3$, about 1.213 gm/cm$^3$, about 1.3 gm/cm$^3$, about 1.4 gm/cm$^3$, or about 1.5 gm/cm$^3$. In some embodiments, the briquette has a durability index value of about 5% to more than about 93%, including about 10%, about 20%, about 30%, about 40%, about 50%, about 60%, about 70%, about 80% and about 90%.

Thus, in some embodiments, the presently disclosed subject matter provides native lignin in the form of lightly torrefied material (LTM) and also provides for the modifying of the lignin in-situ such that the resulting briquette is hydrophobic as well as durable. The presently disclosed subject matter provides combinations of materials, equipment, and processes to produce durable and transportable torrefied briquettes without the use of an added binder. In some embodiments, the presently disclosed subject matter employs ratios of wood torrefied at a lower (Lightly torrefied material—LTM) and higher (highly torrefied material—HTM) temperature. In some embodiments, a LTM and HTM, at a representative range of particle size, such as might be provided by using a screen or sieve having pore sizes ranging from 1/16 inch or less to 1 inch or less, are mixed to a representative ratio of moisture (typically 7-15%), such as with the addition of water or steam. In some embodiments, this material is preheated to about 40-80° C. and sent to the feeding hopper of the briquetter for densification. Representative screen/sieves sizes thus include 1/16 inch or less, 1/8 inch or less, 1/4 inch or less, 1/2 inch or less, 3/4 inch or less, and 1 inch or less Any suitable die configuration as would be apparent to one of ordinary skill in the art can be employed in accordance with the presently disclosed subject matter. In some embodiments, the die configuration on the briquetter includes a conical die, 1-3 extension dies (to control retention time), and an end die. As would be apparent to one of ordinary skill upon a review of the instant disclosure, retention times can vary depending on the production rate and biomass type. By way of example and not limitation, the retention time can vary between 2 to several seconds, with a preference for longer retention times, but typically not in minutes. In adding more retention dies, impact on machine runnability is considered. Additionally, in some embodiments, the die configuration can include an extension die with a cooling jacket in order to flash cool the briquette. Representative die configurations are (42-36)(36-36)(36-36)(36-40) and (42-34)(34-34)(34-34)(34-40). See, for example, FIG. 1.

In some embodiments, the die configuration is preheated prior to the introduction of the feed mixture. In some embodiments, the die configuration is preheated to 200 to 250° C. prior to the introduction of the feed mixture. In some embodiments, the pressure is maintained in the range of 10,000 to 15,000 psi. Temperature, pressure, and moisture conditions present in the die, as well as that of feed mix, achieve the lignin modification to provide hydrophobicity and binding ability to the feed mix. In some embodiments, the operating temperature of the die configuration is at least about 200° C. to about 250° C. In some embodiments, the combination of the material mix and the die configuration at the representative moisture content promotes hydrothermal treatment of the LTM and its lignin content and the generated steam allows for the flow of lignin within the briquette structure, thus promoting hydrophobicity and durability through improved bonding.

In some embodiments, the presently disclosed subject matter provides improved product attributes and economic viability of a biomass torrefaction plant. By way of elaboration and not limitation, hydrolysis based C5 sugar extraction is gaining recognition as a method of value addition for industrial and agricultural biomass wastes. Additionally, coal substitution using torrefied biomass is deemed a viable alternative that can develop around existing coal infrastructure. In accordance with the presently disclosed subject matter, integrated hydrolysis based C5 extraction and subsequent residual torrefaction are provided as an approach to enhance feasibility of biomass to bio-coal. The presently disclosed subject matter demonstrates that hydrolysis increased the porosity of wood and this facilitated torrefaction in improving hydrophobicity and energy content of wood by enhancing heat and mass transfer during torrefaction while reducing ash and air emissions. In some embodiments, the presently disclosed subject matter demonstrates that hydrolysis based C5 extraction of wood can be employed as a pretreatment strategy that provides significant value addition as C5 platform sugars, in addition to providing quality improvement for biomass derived coal.

Thus, further provided, in some embodiments of the presently disclosed subject matter, are pretreatment methods performed prior to producing a torrefied biomass to provide a torrefied biomass product having improved properties, where the methods make use of a hydrolysis procedure prior to torrefaction to produce an improved torrefied biomass product. In some embodiments, a method of producing a torrefied biomass is provided that comprises an initial step of providing a biomass, such as those biomasses described above, and then subjecting that biomass to an acid hydrolysis prior to torrefaction. For example, in some embodiments of the presently disclosed subject matter, to produce a sufficient biomass hydrolyzate, an amount of solid biomass material is initially placed in a reactor and is then exposed to an acid solution that is percolated through the material at an elevated temperature and for a sufficient amount of time to allow a hydrolysis reaction to occur. In some embodiments, the elevated temperatures used in accordance with the hydrolysis procedure range from about 100° C. to about 150° C. (e.g., about 100° C., 105° C., 110° C., 115° C., 120° C., 125° C., 130° C. 135° C., 140° C., 145° C., or 150° C.) with a reaction time of about 30 to about 120 minutes (e.g., about 30, 35, 40, 45, 50, 55, 60, 65, 70, 75, 80, 85, 90, 95, 100, 105, 110, 115 or 120 minutes). Of course, a number of acids can be used to effectuate a sufficient hydrolysis reaction including, in some embodiments, mineral acids such as sulfuric, hydrochloric, etc., and organic acids such as dicarboxylic acids (e.g., oxalic, maleic, etc.) In some embodiments, the acid can be provided at a concentration of about 0.2 wt % to about 5.0 wt %, including about 0.2, 0.5, 0.7, 1.0, 1.2, 1.5, 1.7, 2.0, 2.2, 2.5, 2.7, 3.0, 3.2, 3.5, 3.7, 4.0, 4.2, 4.5, 4.7, or 5.0 wt %. For further explanation and guidance relating to reaction conditions for producing a biomass hydrolyzate, see, e.g., Fonseca, et al., Biomass and Bioenergy, 21 (2014), 178-186, herein incorporated herein by reference in its entirety. The hydrolysis reaction is a mild acid hydrolysis and the process conditions employed promote selective hydrolysis of hemicellulose (C5) based sugars such as xylose and arabinose rather than hydrolyzing cellulose (C6) based sugar. Representative processes are also disclosed in Published U.S. Patent Application No. 2016-0297845 and U.S. Pat. No. 10,093,953, herein incorporated by reference in their entireties.

In some embodiments, subsequent to forming the hydrolyzate, the residual biomass is then dewatered or dried to produce a hydrolyzed material having desired moisture content in the range of 6 to 20%, including about 6%, about 7%, about 8%, about 9%, about 10%, about 11%, about 12%, about 13%, about 14%, about 15%, about 16%, about 17%, about 18%, about 19%, and about 20%. Torrefaction is then performed according to methods known to those in the art and/or as disclosed elsewhere herein, whereby the prehydrolyzed biomass is subjected to elevated temperatures (e.g., 300° C.) for a sufficient period of time (e.g., 30 min). Torrefaction treatment can be classified into light, mild, and high corresponding to temperatures of approximately 200-235° C., 235-275° C., and 275-300° C., respectively. In some embodiments, by subjecting a biomass to a hydrolysis pretreatment procedure, a torrefied biomass material or product can be produced having increased hydrophobicity, reduced soot and ash content upon burning, as well as an increase in calorific values as compared to torrefied materials produced using an unhydrolyzed biomass.

In some embodiments, a portion of the hydrolyzed material is subjected to torrefaction at a lower temperature range (e.g., about 160° C. to about 220° C.) to produce a LTM. Further, a portion of the hydrolyzed material is torrefied at temperatures above about 240° C. to produce a HTM. The LTM and HTM are then combined and treated in accordance with embodiments of the presently disclosed subject matter as disclosed herein above.

The presently disclosed subject matter is further illustrated by the following particular but non-limiting Examples.

EXAMPLES

Materials and Methods for Example 1-7

Production of Briquettes. The torrefied materials used in the study described below were softwood and were sourced from Solvay Biomass Energy, Quitman, Miss., United States of America. The initial moisture content was measured using Denver Instrument IR60 moisture analyzer (Denver Instrument Company, Bohemia, N.Y., United States of America) by using a 1 gm sample. The moisture content was 8.20% for lightly torrefied materials (LTM) while it was 6.76% for highly torrefied materials (HTM).

The briquettes were produced using a C. F. Nielsen BPU 3200 commercial briquetter (C. F. Nielsen, Baelum, Denmark). The LTM material was loaded by a screw feeder and processed at room temperature. The mixture of HTM and LTM materials were mixed in a 20:80 weight ratio and their moisture content was adjusted as shown in Table 1. The mixture was preheated to about 50° C. using steam in a hopper. The die system in the briquetter was made from alloy steel and had three extensions with the main die. Different conical orifice angles for the main die and end extension were used. The results reported here were obtained using a die configuration with a 36 mm inner diameter and also with a die configuration with a 34 mm inner diameter. The die configuration was preheated to 250° C. and the material was fed from the main hopper through a dosing screw to the compression screw chamber at 10% of the rated feed capacity (rotating at about 20 rpm). The operating temperature of the die was 225° C. for the 36 mm die. During production, the temperature of the material at the compression chamber was about 75° C. The produced briquettes were allowed to cool to room temperature. The production rate of all briquettes was about 130-140 Kg/hr, and the final moisture content in all briquettes varied from 3% to 7%.

By way of elaboration, the LTM material was loaded by a screw feeder and processed at room temperature to be the control samples. The mixture of HTM and LTM materials are preheated to about 50° C. by placing them in a hopper containing a copper tube that is connected to a steam boiler. The die used in the machine is made from alloy steel and has three extensions with the main die. Two die configurations were used, 36 mm and 34 mm inner diameter. The materials and feed moisture content used in this study for each die set are shown in Table 1. The die was preheated to 250° C. and the material was fed from the main hopper through a dosing screw to the compression screw chamber at 10% feed rate speed, which is about 20 rpm. Then, the material was fed to the compression chamber by the compression screw. The operating temperature of the die was 225° C. for the 36 mm die and 240° C. for the 34 mm die. During production, the temperature at the compression chamber was about 75° C. The mixture was softened and deformed in the main die by the action of moisture, heat and pressure altogether. The produced briquettes were allowed to cool to room temperature. The production rate of all briquettes was about 130-140 Kg/hr, and the final moisture content in all briquettes was 3-7%.

FIG. 1 shows a schematic of the die, the angles used for the conical main die, and the last extension. A coolant extension die was also designed and made to be used to cool the briquettes in order to freeze any moisture and lignin before leaving the die. The effect of moisture on the briquettes shape indicates that the higher moisture gives darker and shiny briquette (i.e. hydrothermal treatment effect).

TABLE 1

Materials Used and Associated Moisture Contents.

| | Material | Moisture content (%) | |
|---|---|---|---|
| | | 36 mm die | 34 mm die |
| 1 | LTM | 8.2 | 8.2 |
| 2 | 20% HTM-80% LTM | 10.75 | 7.5 |
| 3 | 20% HTM-80% LTM | 14 | 10 |
| 4 | 20% HTM-80% LTM | 16 | 12.79 |

Briquette Characterization. Bulk density was calculated by using the water displacement method in which a small puck sample of each briquette was taken after about 2 weeks of storage then weighed and coated with paraffin wax to prevent any water absorption during immersion in water. The waxed samples were weighed and then submerged into water. The volume of the displaced water was measured and recorded as the volume of the waxed sample. The volume of each sample was calculated by subtracting the volume of coating wax from the volume of waxed samples. The bulk density of briquettes was calculated by dividing the weight of each sample by the volume.

Hydrophobicity by moisture uptake was measured using a Fisher Scientific Humidity Chamber device (Fisher Scientific, Pittsburgh, Pa., United States of America). The briquette samples were first weighed then placed in the humidity chamber and maintained in 90% humidity at 30° C. for 24 hours. The samples were then weighed and dried in an oven at 60° C. for 6 hours, and final weights were recorded. The change in weight referred to moisture absorption.

A water immersion test was also conducted using two different times, 30 second and 30 minute, to measure the water gain of each sample. Also, a water immersion test for 24 hours was conducted to observe the effect of long time direct water contact on the produced briquette's shape.

The Durability Index of produced briquettes was determined according to the ASAE S269.4 and ISO 15210 standards. The mechanical durability of briquettes were tested by specific abrasion drum (Gamet Automatic Sampling Equipment Company, Brooklyn Park, Minn., United States of America), in which samples of 500±50 g were weighed to the nearest 0.1 g and placed in the tumbling box device. Then they tumbled at 50±2 rpm for 500 rotations. Then the samples were removed and passed manually through a 3.15 mm sieve. The mechanical durability index (DU) was calculated using the following formula:

$$DU = (M_A/M_E) * 100 \quad (1)$$

Where: $M_E$ is the mass of the samples before the drum treatment and $M_A$ is the mass of sample left after sieving the resultant pieces after tumbling.

The calorific value of the prepared briquettes was measured using a bomb calorimeter type IKA C2000 (IKA, Wilmington, N.C., United States of America). The device was calibrated using benzoic tablets of 1 gm and sample pieces of around 1 gm were used from each briquette for calorific value analysis.

The chemical functional groups that were present in briquettes were analyzed using FTIR spectroscopy using powdered samples of about 20 mg from each briquette. FTIR curves obtained were normalized to C=C peak at 1506 $cm^{-1}$ assuming negligible change in aromatic ring count (originated from lignin) in the sample.

Example 1

Characterization of Briquettes

Tables 2A and 2B show the characterization results for the produced briquettes. As shown in the Table 2B, the briquette with 20% HTM and 10.75% moisture performed better than the other samples in the 36 mm diameter die. They showed a higher durability of 68%. They also showed the lowest water gain after 30 seconds as well as after 30 minutes.

TABLE 2A

Results of Briquettes Characterization

| | 36 mm Diameter Die | | 34 mm Diameter Die | |
|---|---|---|---|---|
| Material | LTM | 20% HTM-LTM | LTM | 20% HTM-LTM |
| Property | (8.2% MC) | (10.75% MC) | (8.2% MC) | (7.5% MC) |
| Diameter (mm) | 38 | 38 | 36.5 | 36.5 |
| Bulk Density (gm/cm³) | 1.178 | 1.065 | 1.191 | 1.213 |
| Moisture content of produced briquettes (%) | 6.31 | 6.44 | 4.97 | 3.74 |
| Moisture uptake (%) | 8.23 | 8.66 | 8.77 | 8.07 |
| Water gain after 30 sec test | 7.2 | 3.8 | 1.95 | 1.36 |
| immersion (%) 30 min. test | 69.8 | 30.5 | 30.43 | 30 |
| Durability Index (%) | 44.6 | 68 | 78.2 | 78.2 |
| Calorific value BTU/lb (Kj/Kg) | 9103 (21173.578) | 9369 (21792.294) | 9272 (21566.672) | 9659 (22466.834) |

TABLE 2B

Characterization Results for Briquettes
Produced from 36 mm Diameter Die Set

| Material<br>Property | LTM<br>(8.2% MC) | 20% HTM-LTM<br>(10.75% MC) | 20% HTM-LTM<br>(14% MC) | 20% HTM-LTM<br>(16% MC) |
|---|---|---|---|---|
| Diameter (mm) | 38 | 38 | 38.5 | 38.5 |
| Bulk Density (gm/cm$^3$) | 1.178 | 1.065 | 1.06 | 1.053 |
| Moisture content of produced briquettes (%) | 6.31 | 6.44 | 7.2 | 7.8 |
| Moisture uptake (%) | 8.23 | 8.66 | 7.91 | 7.26 |
| Water gain after 30 sec. test | 7.2 | 3.8 | 13 | 37.5 |
| immersion (%) 30 min. test | 69.8 | 30.5 | 47.6 | 63.3 |
| Durability Index (%) | 44.6 | 68 | 52.5 | 40.6 |
| Calorific value: | 9103 | 9369 | 9385 | 9459 |
| BTU/lb (Kj/Kg) | 21173.6 | 21792.3 | 21829.5 | 22001.6 |

Example 2

Effect of HTM Material and Moisture Content on Briquette Shape and Binding

As shown in Tables 2A and 2B, the briquette made with 100% LTM showed a high level of moisture uptake and also has a lower energy content compared to the ones with HTM added at 20%. The addition of HTM not only improved the energy content of the briquette, but also helped improve the hydrophobicity. High moisture content can increase binding in biomass material by activating (softening) the natural binders within that material such as lignin. Lignin is a thermoplastic material which would undergo plastic deformation at pressures and temperatures in the range of their glass transition temperatures. Also, high moisture content in the biomass along with the application of pressure and temperature, a hydrothermal treatment can be made to the biomass which activates the natural binders while deforming the particles. Hence, maintaining a certain level of moisture content during densification promotes binding within the briquette. However, as shown in Table 2B, for moisture content above 10.75%, there was a reduction in the durability of the briquette. When increasing the moisture content above 10.75%, the briquettes appeared darker and showed hydrothermal impact; but the high moisture and the resulting steam formation during densification led to a significant number of cracks and this divided the briquettes into small pucks. The diameter measurement results shown in Table 2B showed that briquettes had expanded compared to the inner diameter of the die. The LTM briquettes had expanded about 2 mm while the mixed briquettes with higher moisture expanded a little more than 2 mm. These cracks picked up more water as shown by water gain after 30 sec and 30 minutes during the water immersion tests (Table 2B).

Example 3

Bulk Density

Figure 2:
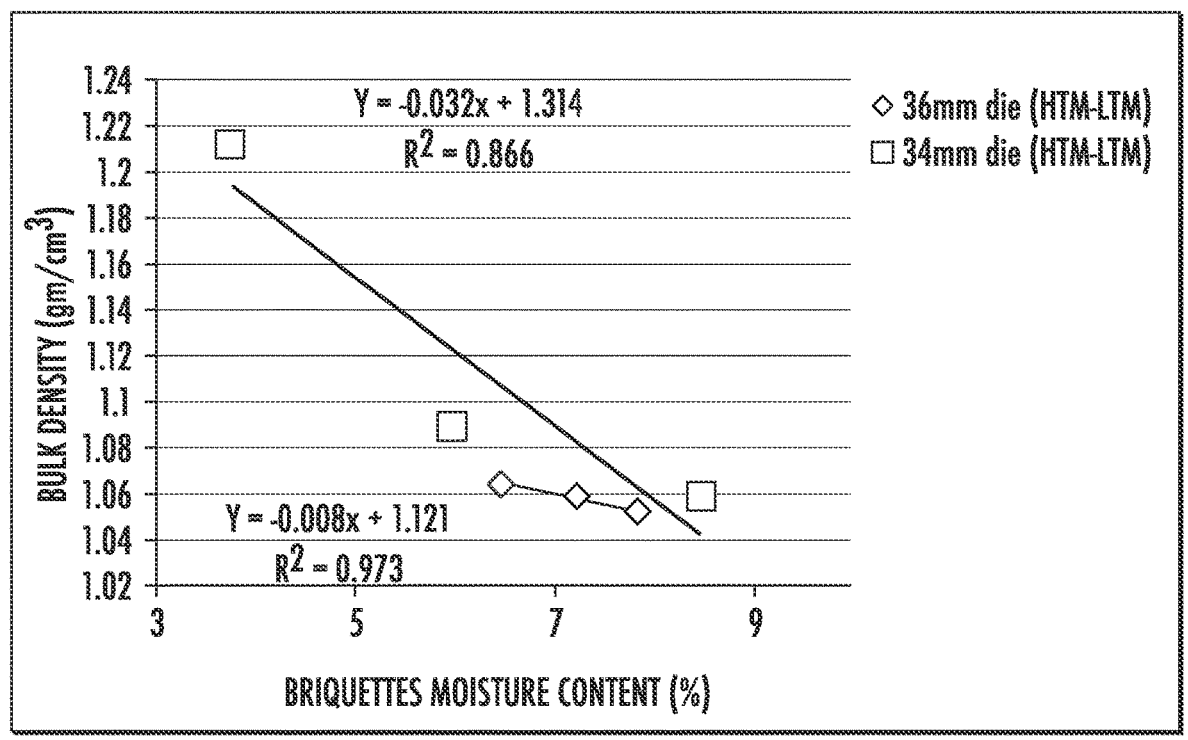
FIG. 2 is a graph showing bulk density versus moisture content of briquettes produced in accordance with the presently disclosed subject matter.

Bulk density is an important characteristic of biomass briquettes due to its influence on the handling and transportation of materials. As shown in Table 2B, bulk density decreased with the addition of HTM material and with the increase of moisture content. This was due to the light weight of HTM when compared to the LTM. Since high moisture combined with high temperature and pressure increases binding in biomass, density should also increase with the increase of moisture. However, the decreased bulk density values in the mix HTM-LTM briquettes is due to the resulting cracks and initial moisture content in the raw or mix materials. The lower bulk density values at higher moisture are explained in detail (shown) in FIG. 2, in which the bulk density decreased with increasing of moisture content in the tested puck samples taken from the produced briquettes for both die sets. The 7.5% moisture briquettes produced using the 34 mm die showed the highest bulk density; this was evidenced by more compaction, higher binding and lower cracks. Also, the bulk density of 34 mm die briquettes was higher than that of the 36 mm for the same LTM material due to higher compaction resulting from lower die diameter. See Table 2A.

Example 4

Hydrophobicity

Briquette exposure to humid or rainy environments during transportation and storage could adversely affect the durability of the densified products; hence hydrophobicity of the briquettes is highly desired. For the water immersion results, feed moisture above 14% led to increased water uptake. Since this test used direct contact of water, it depended more on how densified the sample was and how many cracks were in it. At 30 seconds time, the mix briquette with 10.75% moisture gave the lowest water uptake followed by LTM briquette. Increasing the immersion time to 30 minutes still showed that 10.75% sample have the lowest uptake, while the LTM sample absorbed more water than all of the mixed briquettes and eventually disintegrated. Further, 10.75% and 14% samples stayed intact at the end of this test. The 24 hours water immersion test results for the 36 mm die set revealed that moisture content of 10.75% led to increased water resistance and the sample stayed solid and intact after taking it out from water. In fact, the sample of 10.75% stayed intact after 10 days of soaking. The one with 16% moisture could break up easily when touched. Although higher moisture content can give these briquettes some binding with enhanced hydrothermal treatment, it did not help in binding the whole briquettes together along the die.

This could be mainly due to increased cracks in the briquettes during the release of excess moisture as steam and made small pucks in the briquettes. The die temperature required for hydrothermal treatment was also reduced from 250° C. to 175° C. due to the presence of excessive moisture. Same results were found for the 34 mm die briquettes except that the cracks start at moisture content higher than 10%.

Example 5

Durability

Figure 3:
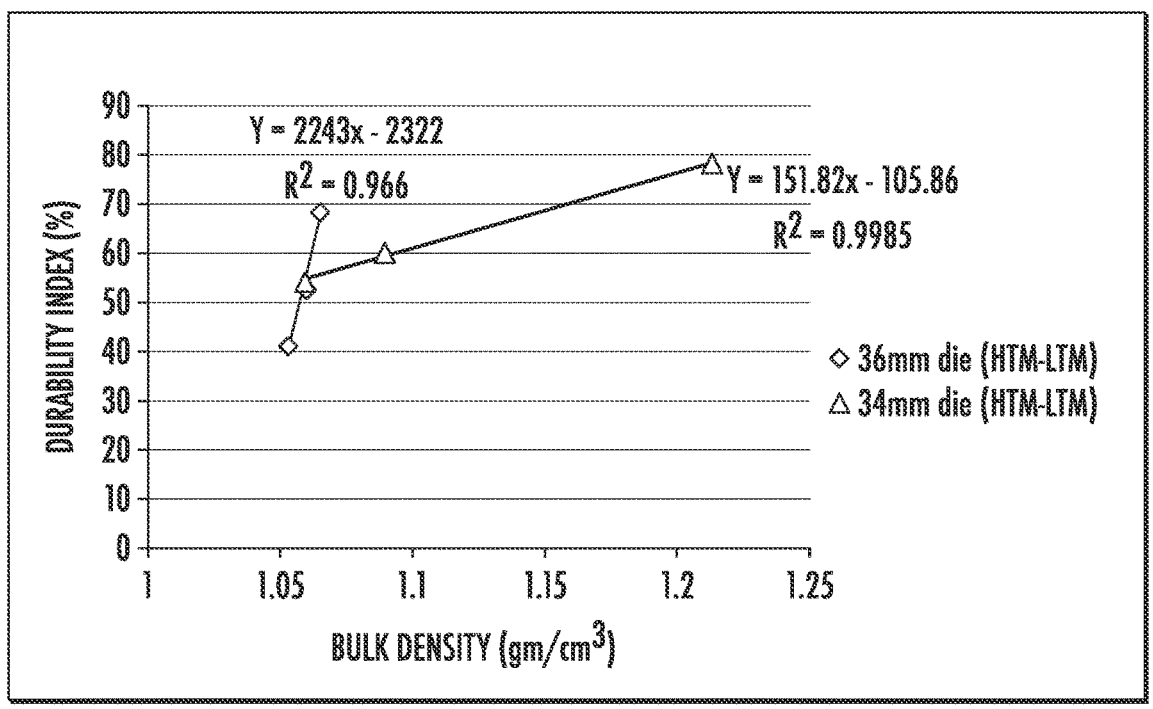
FIG. 3 is a graph showing a linear correlation between mechanical durability and bulk density.

Mechanical durability is one of the significant parameters from the viewpoint of handling and transportation using existing coal infrastructure. The durability index results of each sample are shown in Tables 2A and 2B. In Tables 2A and 2B, the highest durability index was for the 10.75% mix sample. Those low moisture levels reduced the cracks and enhanced overall binding (i.e. mechanical binding) compared to other samples. FIG. 3 shows a plot of the measured mechanical durability values versus the calculated bulk density values and illustrates an interesting correlation between durability index and bulk density of the briquettes. The R-square values obtained near to 1, indicates that good linear correlation exists between the bulk density and mechanical durability of briquettes. The results of 34 mm die set in Table 2A followed similar behavior and these trends indicated that good compaction with better density provided strong durable briquettes. However, the lower durability index in the 36 mm LTM compared to 34 mm LTM may refer to lower in-situ binding even though it had higher density than 34 mm LTM sample. This could be due to the higher pressures associated with the 34 mm die in the briquetting process. It was clear that adding of HTM material reduced the binding ability and this could be overcome by adopting optimized material and process parameters such as moisture, pressures, and temperatures. In this study, good conditions were provided by the 34 mm die, 7.5% moisture in the feed and die temperature of 250° C.

Example 6

Heating Value

According to Tables 2A and 2B, higher calorific value always related to the use of highly torrefied materials (HTM). Effective binding with optimized balance of moisture content, process parameters and LTM/HTM mix gave briquettes higher heating value. On the other hand, higher moisture content helped in raising the heating value by promoting hydrothermal cooking; even though durability suffered from cracks created from steam.

Example 7

FTIR

Figure 4:
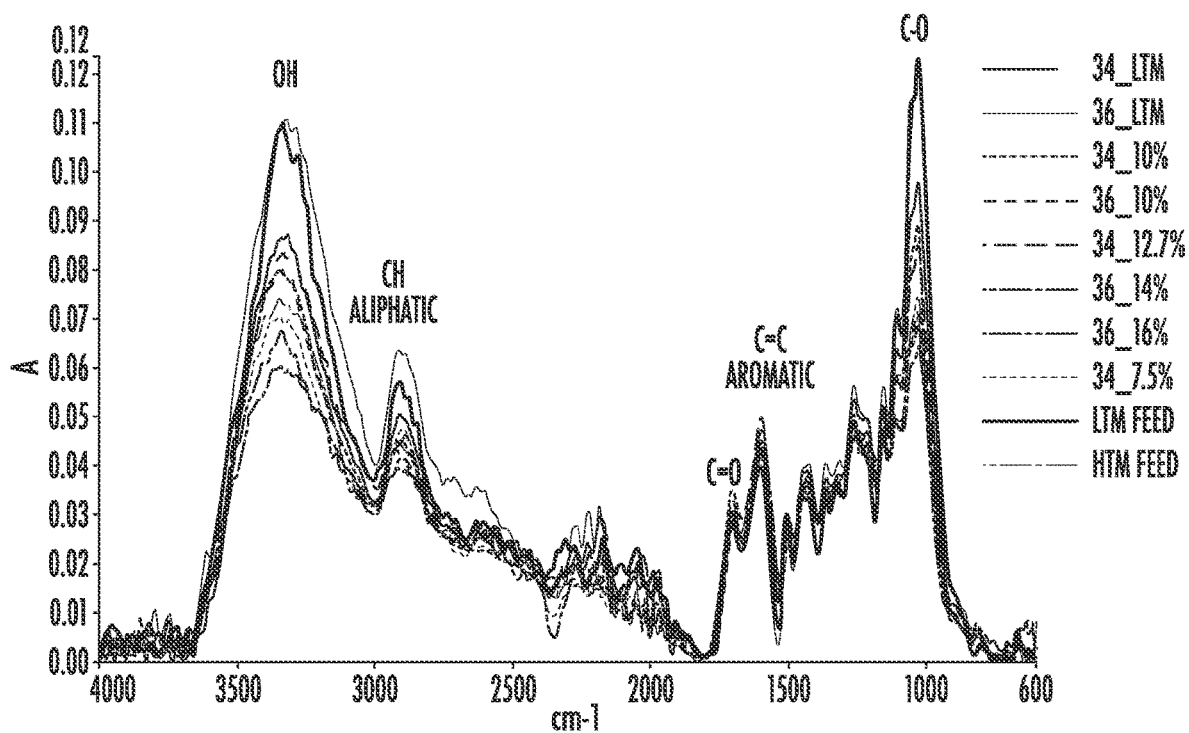
FIG. 4 is a graph showing Fourier-transform infrared spectroscopy (FTIR) spectrums of the densified biomass samples.

According to FIG. 4, increasing the moisture content in the feed reduced the oxygen bearing functional groups such as O—H (3350 $cm^{-1}$), C—O (1050 $cm^{-1}$), and C=O (1700 $cm^{-1}$). This observation is consistent with the higher hydrophobicity observed for high moisture runs in the hydrophobicity chamber test. This indicated that steam generated during densification due to the available moisture could possibly act as a reducing agent leading to the associated dehydration. 34 mm runs demonstrate lower oxygen functionalities compared to 36 mm. This implied that possibly 34 mm runs generated higher steam temperatures due to higher pressures than corresponding 36 mm runs and this helped in dehydrating/deoxygenating the biomass to a greater extent. Aliphatic CH (2950 $cm^{-1}$) bonds were also reduced in the higher moisture runs due to the reduction of weaker aliphatic carbon such as hemicellulose in the biomass.

Summary of Examples 1-7

The results showed that a mixture of HTM and LTM biomass could be densified without using any added binders. The added moisture to the feed mixture gave the briquettes a waxy like coating and a shiny appearance due to the migration of lignin (entrained by steam from moisture) from the interior of the briquettes. Also, it can enhance in-situ binding and thus increasing hydrophobicity and calorific value. At the same time, it can initiate cracks at the end product that reduce overall density and durability. Higher density and durability was related to the binding, higher briquetting pressure (i.e. using of 34 mm die) and lower moisture content at the end product. Lightly torrefied material could be used as the source of natural binder (lignin) as they provide the chemistry and amount of lignin that is necessary for binding. Briquettes of mixed torrefied levels of biomass with good in-situ binding could give good heating value, hydrophobicity, density and durability, and could be made in a large-scale production.

Introduction for Examples 8-9

In the following Examples, efforts were undertaken to hydrolyze biomass prior to torrefaction as a co-product strategy to improve economics of bio-coal process. The added value of the xylose recovered from hydrolyzate could offset the price of bio-coal production and be competitive with current coal technologies. There is no prior study that reports integration of pre-hydrolysis to extract and recover hemicellulose-based sugars (e.g., xylose) and subsequent torrefaction of hydrolyzed wood.

Materials and Methods for Examples 8-9

The wood chips used in the following Examples were obtained from Coleraine Labs Minnesota, Coleraine, Minn., United States of America. The wood chips were dried to less than 10 wt % moisture. Moisture balance readings for each biomass were performed on 1 g samples using an Intelligent Weighing Technology Model IL-50.001 (Intelligent Weighing Technologies, Camarillo, Calif., United States of America). Sulfuric acid used as a catalyst for hydrolysis reaction was purchased from VWR (≥99% purity) (VWR, Radnor, Pa., United States of America) and was used as received.

In the study, dilute acid hydrolysis was conducted as described previously for C5 sugar extraction. Acids strength of 4 wt % based on biomass were maintained in the reaction. The hydrolysis reaction was performed in a 6 L M/K digester reactor with a ramp up time of 50 min and a reaction time of 1 hour at temperature of 140° C. and a pressure of 50 psi. 300 g of wood chips (dry weight) was used with 3 L of water. At the end of the reaction, the reactor was cooled below 40° C. by external water loop connected through a heat exchanger.

Hydrolyzate produced from the reaction was analyzed via HPLC (Water 600E and Agilent 1260 Infinity, Agilent, Santa Clara, Calif., United States of America) for sugars and sugar degradation products. Resulting residual wood chips were dried overnight in an oven at 60° C. to reduce the moisture content to less than 5 wt %. Both unhydrolyzed wood chips and hydrolyzed wood chips were subjected to torrefaction treatment in a tube furnace (MTI, GSL1500X, MTI, Richmond, Calif., United States of America) operating under nitrogen flow of 100 ml/minute. The temperature of the furnace was maintained at 300° C. for 30 min with a temperature ramp-up time of 10° C./min. Sample weights after torrefaction were recorded for both samples and they were subjected to moisture tests as detailed above. The calorific value of the wood samples was measured using an IKA C2000 calorie meter. The calorie meter was calibrated using 1 g of benzoic tablets prior to testing. For the analysis, around 1 g of solid pieces were extracted from wood samples. Moisture uptake of the wood samples were analyzed in a humidity chamber (Fisher Scientific Humidity Chamber, 905) maintained at 90% humidity at 30° C. The wood samples were dried in a vacuum oven at 60° C. for 24 hours and dry weights were recorded. The dried samples were placed in the humidity chamber for 24 hours and weighed afterwards. The change in weight indicated the ability to absorb moisture, which can be used as an indicator of the hydrophobicity of the wood.

The molecular level chemical changes that occurred in wood during hydrolysis and torrefaction were analyzed using an ATR enabled FTIR spectrometer (Spectrum 100, PerkinElmer, Sheldon, Conn., United States of America) for pieces of the briquette. About 20 mg of powdered sample was (<40 sieve) placed on top of the ATR crystal covering the whole crystal. FTIR curves obtained were normalized to $C=C$ peak at 1506 $cm^{-1}$ assuming relatively unchanged aromatic ring count during the MW treatment.

Thermal analyses were also performed on these samples on SDT Q600 to quantify the ash content of the samples. Around 10 mg of the sample was placed in the furnace operating under air (carrier gas) and temperature was raised until 700° C. using a heating rate of 50° C./min. The weight loss curves were recorded to quantify the ash as the residual weight. SEM images of unhydrolyzed and hydrolyzed wood samples were obtained using FEI TESCAN SEM 600 to understand the structural changes that occurred during hydrolysis.

Example 8

Acid Hydrolysis

As seen in Table 3, hydrolyzate of wood contained a significant amount of xylose (12 g/L) out of total sugar of 14.4 g/L. This very high selectivity (82.3%) for xylose was advantageous in reducing recovery cost as a platform chemical. Table 4 indicated that hydrolysis of wood slightly enhanced the energy content of the wood and this enhancement could be due to the removal of oxygen rich hemicellulose in hydrolyzed wood compared to cellulose and lignin. Interestingly, the torrefied post hydrolyzed samples showed an increase energy content of 5.5% compared to torrefied untreated wood.

TABLE 3

Sugar Products in Wood Hydrolyzate

| Acid | Xylose | Glucose | Arabinose | Total Sugars |
|---|---|---|---|---|
| Sugar Concentration (g/L) | 11.8 | 1.0 | 1.5 | 14.4 |
| Sugar Selectivity (%) | 82.3 | 7 | 10.7 | |

Figure 5:
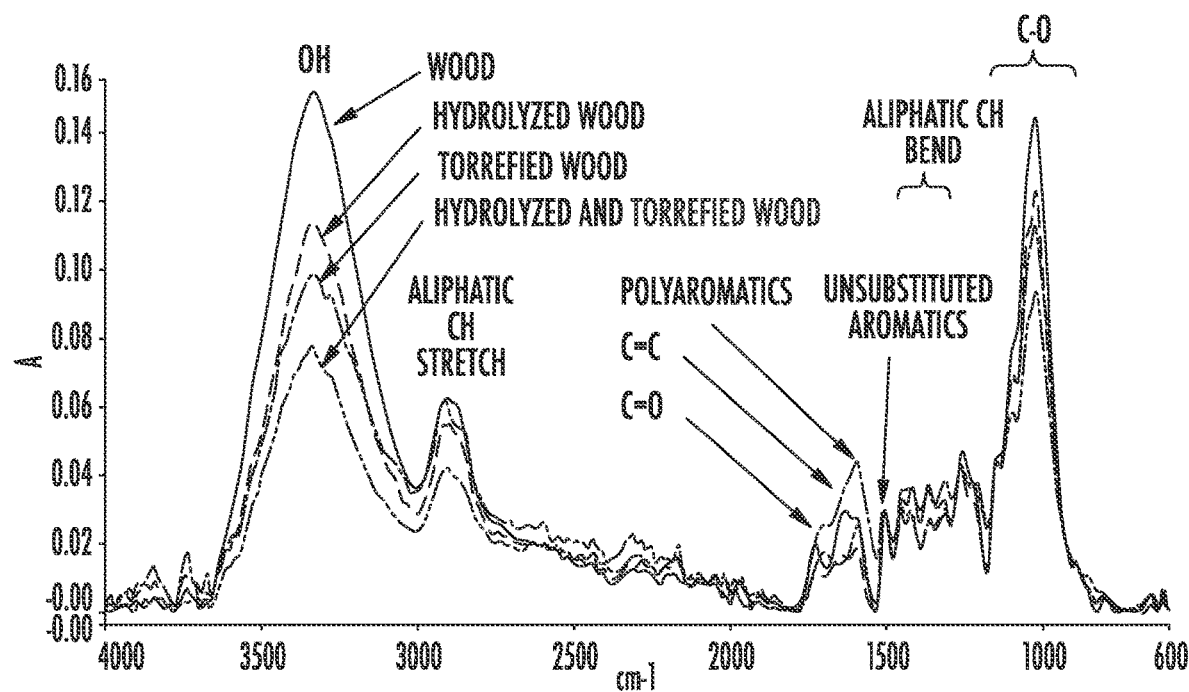
FIG. 5 is a graph showing a FTIR analysis for hydrolyzed and torrefied wood.

To understand this dramatic energy enhancement, further analyses were performed as detailed below. As mentioned in the method section FTIR spectrums were normalized to the aromatic peak at 1505 $cm^{-1}$ assuming intact single ring aromatic rings that originates from lignin (FIG. 5). As expected the oxygen functionalities that include OH (3000 $cm^{-1}$), C—O (1100 $cm^{-1}$) and aliphatic C—H (2800 $cm^{-1}$, 1300-1400 $cm^{-1}$) drop dramatically in post hydrolyzed wood with the removal of oxygen rich aliphatic hemicellulose. Both the torrefied samples (unhydrolyzed and hydrolyzed) showed similar trend of reduced oxygen functionalities and decreased aliphatics. The $C=O$ (1700 $cm^{-1}$) bonds increased significantly for torrefied samples that could be coming from dehydrogenating aliphatic COH bonds. Interestingly, the aromatic $C=C$ at 1600 $cm^{-1}$ that predominantly represent polyaromatics, increased dramatically for torrefied samples. These could be most probably coming from the dehydration and dehydrogenation of carbohydrate fraction of biomass as lignin ring opening reactions that needed to form polyaromatics are not plausible in the reaction temperatures employed for torrefaction (300° C.). For torrefied samples aliphatic alkene (1650 $cm^{-1}$) functionalities were also dramatically increased with possible dehydrogenation reactions in the carbohydrate fraction of biomass. Interestingly, the hydrolyzed sample had a significantly lower amount of these polyaromatics and alkenes supporting the notion that these originated from carbohydrates. These results clearly indicated that hydrolyzed wood generated lower soot and fines with polyaromatic structure during torrefaction. It was believed that that finding could be very useful in reducing the fines in torrefied biomass that provide a major obstacle for commercializing torrefied and densified biomass as an alternative for coal.

TABLE 4

Physical Characteristics of Hydrolyzed and Torrefied Wood

| Type | Moisture Content (% from dry wt.) | Heating Value (btu/lb) | Moisture Uptake (% from dry wt.) | Yield (% from feed) |
|---|---|---|---|---|
| Untreated Wood | 6.3 | 8570 | 16.6 | — |
| Hydrolyzed Wood | 5.3 | 8656 | 12.8 | — |
| Torrefied Untreated Wood | 4.7 | 9168 | — | 70.9 |
| Torrefied Hydrolyzed Wood | 4.3 | 9671 | — | 71.0 |

Figure 6:
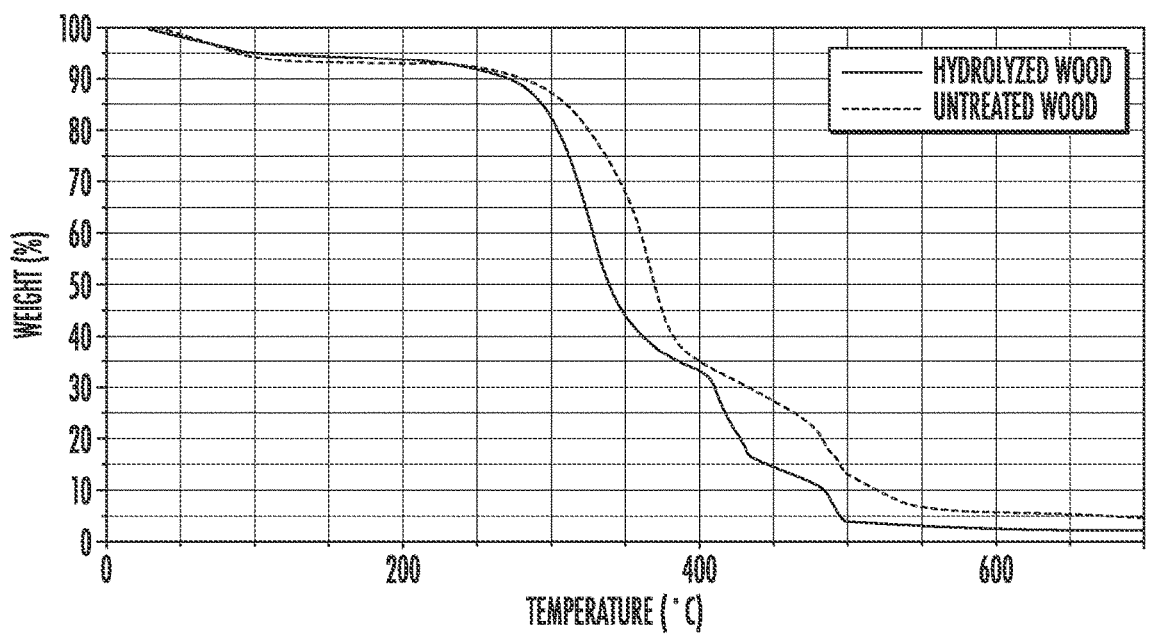
FIG. 6 is a graph showing a thermo-gravimetric analysis (TGA) combustion curve for hydrolyzed wood.

The TGA air combustion performed (FIG. 6) for untreated and hydrolyzed wood demonstrated that the untreated wood had significantly higher ash left over (~5 wt) after combustion compared to hydrolyzed wood (~2.5 wt). This drop of ash could be attributed to ash leaching during acid hydrolysis which worked as a wood purification step in addition to other advantages mentioned above. This ash reduction can be hugely beneficial for torrefied biomass combustion process considering additional operational steps that has to be incorporated to remove ash. Moreover, as shown in FIG. 6, the results indicated that hydrolyzed wood completed the combustion earlier than untreated wood (550° C. vs 600° C.) indicating superior combustion characteristics compared to untreated wood potentially leading to reduced reduction time (increased production rate) in the torrefaction reactor. In scanning electron microscopy (SEM) images, hydrolyzed wood samples showed considerable number of pores, which were absent from the unhydrolyzed wood samples. This enhanced porosity could be attributed to the dramatic calorific value increase during torrefaction, possibly due to enhanced heat and mass transfer that prevailed in hydrolyzed wood compared to unhydrolyzed wood.

Example 9

Cost Analysis

A techno-economic analysis was performed to compare the two scenarios of producing torrefied biomass briquettes with xylose extraction and without xylose extraction. The bases for this analysis are detailed in the Table 5 shown below.

TABLE 5

Basis for Cost Calculations

| Factor | Value | Comment |
|---|---|---|
| 1 MT of wood chips (green) | $80 | 50% Moisture |
| 1 MT of torrefied wood pellets / briquettes | $220 | |
| 1 ton of xylose | $2,000 ($1/lb) | Short ton |
| Torrefied wood yield | 70% | (80% max) |
| Xylose yield | 20% | (25% max) |
| Operating costs | 40% | Of total revenue |
| Plant capacity | 100,000 MT/y | Torrefied wood pellets/briquettes |

Assuming $80/MT price for the green wood chips with a moisture content of 50%, torrefaction increased the value of wood chips to a price of $220/MT. Xylose price was adopted from the whole sale market price. Torrefied wood yield and xylose yield were assumed at 70 wt % and 20 wt % of the feed. The operating cost was estimated to be 40% of the total revenue. For xylose extraction scenario, it was assumed that the hydrolyzed wood was at a moisture content of approximately 50%, which is same as the feed wood chips.

Table 6 shows the results of the cost calculation carried out for these two scenarios. The estimated plant cost increased by $5,000,000 for xylose extracted scenario due to additional equipment necessary that include hydrolyzer and xylose separation unit. Cost of wood chips would be nearly $22.9 million for both cases. When the revenues were compared, xylose scenario generate $50 million more per annually mainly due to by product income of xylose which amount to $57 million. The torrefied wood income increased by $2 million. The yield was 70% due to higher BTU associated with torrefied xylose extracted wood. Operating costs calculated as 40% of revenue was comparably higher for with xylose scenario. Base case payback calculated for xylose scenario provided a value of 0.8 years, compared to negative value obtained for unhydrolyzed scenario, where it is impossible to payback as revenue after feedstock and operating costs was negative. When the sensitivity of payback is analyzed for different biomass feedstock costs, it is evident that it is only possible to have positive payback value if the feedstock value is lower than $40/ton, which is very unlikely.

TABLE 6

Cost Analysis Results

| | Without Xylose | With Xylose |
|---|---|---|
| Plant cost (estimated) | $15,000,000 | $20,000,000 |
| Cost of wood chips (green) | $22,857,143 | |
| Revenue: | $22,000,000 | $79,771,429 |
| Torrefied wood pellets / briquettes | $22,000,000 | $22,628,571 |
| BTU of torrefied | 9170 BTU/lb | 9670 BTU/lb |
| Xylose | | $57,142,857 |
| Operating costs | $8,800,000 | $31,908,571 |
| Payback (years) | (1.55) | 0.80 |
| | Payback | |
| Cost of wood chips ($/ton) | | |
| $20 | 2.00 | 0.47 |
| $40 | 8.47 | 0.55 |

TABLE 6-continued

Cost Analysis Results

| | Without Xylose | With Xylose |
|---|---|---|
| $60 | (3.80) | 0.65 |
| $80 | (1.55) | 0.8 |

Summary of Examples 8-9

In the foregoing study, hydrolysis of wood was performed to extract C5 sugars prior to torrefying residual wood to produce bio-coal. Wood hydrolyzate contained xylose at a concentration of at 11.8 g/L with a very high selectivity of 82%. Hydrolyzed wood showed a slight increase in calorific value compared to unhydrolyzed wood, but most interestingly, the caloric value increase was significant for torrefied hydrolyzed wood compared to torrefied unhydrolyzed wood. According to FTIR analysis, both hydrolysis and torrefaction reduced the oxygen functionality indicating increased hydrophobicity. This observation was supported by the lower moisture uptake in hydrolyzed wood compared to unhydrolyzed wood. SEM images showed significant porosity enhancement for hydrolyzed wood samples. These results collectively demonstrated that hydrolysis enhanced porosity and hydrophobicity and that this facilitated torrefaction in improving calorific value. The ash content was also reduced due to hydrolysis leaching and this provides considerable advantage in handling during combustion. Further, the preliminary techno-economic analysis performed indicate that our scenario can generate NPV significantly higher than untreated wood. In summary, the study demonstrated that hydrolysis based C5 extraction of wood can be employed as a pretreatment step that provides a significant value addition as C5 platform sugars, in addition to providing low ash and higher energy bio-coal product.

Additional Examples

Briquetter Trial
Machine: C.F.Nielsen BPU3200
Die configuration (diameter in mm): (42-36)(36-36)(36-36)(36-40)
Temperature: 250° C.
Material: Mixture of 20% HTM and 80% LTM
MC=14%, material was processed as received without pre-heating
Results:
1. The Trial was successful.
2. The produced briquettes expansion also was lower as compared to the ones produced from LTM only.
3. Although the briquettes have small cracks, they did not divide into small pucks.
4. The binding in these briquettes was better because of the increased moisture content.
5. The water soaking test revealed that these briquettes were better in hydrophobicity.
6. 14% MC with 20% HTM was glossy.
Briquette Trial
Summary:
1. Ran two trials using LTM and HTM mix.
2. Die configuration (diameter in mm): (42-36)(36-36)(36-36)(36-40)
3. Temperature: 250° C.
4A. Material: Mixture of (10 and 20%) HTM with (90 and 80%) LTM MC=9.55%, material was processed as received without pre-heating 4B. Material: Mixture of 20% HTM and 80% LTM MC=14%, material was processed as received without preheating 5. These trials showed that an increase in moisture significantly improved hardness as well as hydrophobicity for 80:20 mix of LTM and HTM.

6. The produced briquettes expansion also was lower as compared to the ones produced from LTM only.

7. Although the briquettes have small cracks, the briquettes did not breakup into small pucks.

8. It appears that the binding in these briquettes was better because of the increased moisture content and some preheating 9. The water soaking test revealed that the briquettes from trial stayed intact after 48 hours of soaking. This appears to show that these briquettes have acceptable level of hydrophobicity.

Briquetter Trial

1. Machine: C.F.Nielsen BPU 3200
2. Dieconfiguration (diameter in mm): (42-36)(36-36)(36-36)(36-40)
3. Die Preheat Temperature: 250° C.; Die Operating Temperature: 220° C.
4. Material: Mixture of 20% HTM and 80% LTM MC=10.28%, material was pre-heated to about 50° C.

Results:

1. The produced briquettes showed good packing density, smooth formation, less cracks, and showed better binding (the briquettes did not divide into small pucks) compared to other runs.

2. Radial expansion (diameter around 37 mm) of the finished briquette was lower as compared to the ones produced from LTM only.

3. Similar to other trials, the briquettes showed good hydrophobicity, as no changes in the integrity of the briquette were observed even after 72 hours of water soaking.

4. The briquette gained weight after 24 hours of water soaking. The weight increased from 48 gm to 66 gm. Also, the sample diameter increased 37 mm to 40 mm. The fact that the briquette is staying intact after 72 hours and it is possible to pick it up from water confirms that hydrophobic bonding is being promoted in the briquette.

All publications, patents, and patent applications mentioned in this specification are herein incorporated by reference to the same extent as if each individual publication, patent, or patent application was specifically and individually indicated to be incorporated by reference, including the references set forth in the following list:

REFERENCES

1. Tag A. T., Dumana G., Ucarb S., Yanika J.; "Effects of feedstock type and pyrolysis temperature on potential applications of biochar", Journal of Analytical and Applied Pyrolysis, 120 (2016) 200-206.
2. Wang C., Peng J., Li H., Bi X. T., Legros R., Lim C. J., Sokhansanj S.; "Oxidative torrefaction of biomass residues and densification of torrefied sawdust to pellets", Bioresource Technology, 127 (2013) 318-325.
3. Bridgeman T. G., Jones J. M, Shield I., Williams P. T.; "Torrefaction of reed canary grass, wheat straw and willow to enhance solid fuel qualities and combustion properties", Fuel 87 (2008) 844-856.
4. Yang Z., Sarkar M., Kumar A., Tumuluru J. S., Huhnke R. L.; "Effects of torrefaction and densification on switchgrass pyrolysis Products", Bioresource Technology, 174 (2014) 266-273.
5. Anukam A., Mamphweli S., Reddy P., Okoh O., Meyer E.; "An Investigation into the Impact of Reaction Temperature on Various Parameters during Torrefaction of Sugarcane Bagasse Relevant to Gasification", Hindawi Publishing Corporation, Journal of Chemistry, Volume 2015, Article ID 235163, 12 pages.
6. Asadullah M., Adi A. M., Suhada N., Malek N. H., Saringat M. I., Azdarpour A.; "Optimization of palm kernel shell torrefaction to produce energy densified biocoal", Energy Conversion and Management 88 (2014) 1086-1093.
7. Chen W. H., Peng J., Bi X. T.; "A state-of-the-art review of biomass torrefaction, densification and applications", Renewable and Sustainable Energy Reviews, 44 (2015) 847-866.
8. Ghiasi B., Kumar L., Furubayashi T., Lim C. J., Bi X., Kim C. S., Sokhansanj S; "Densified biocoal from woodchips: Is it better to do torrefaction before or after densification?", Applied Energy 134 (2014) 133-142.
9. Guo L., Wang D., Tabil L. G., Wang G.; "Compression and relaxation properties of selected biomass for briquetting", Biosystems engineering, 148 (2016) 101-110.
10. Nanou P., Huijgen W. J. J., Carbo M. C., Kiel J. H. A.; "The role of lignin in the densification of torrefied wood in relation to the final product properties", Biomass and Bioenergy xxx (2017) 1-15.
11. Peng J., Wang J., Bi X. T., Lim C. J., Sokhansanj S., Peng H., Jia D.; "Effects of thermal treatment on energy density and hardness of torrefied wood pellets", Fuel Processing Technology 129 (2015) 168-173.
12. Peng J. H., Bi X. T., Sokhansanj S., Lim C. J.; "Torrefaction and densification of different species of softwood residues", Fuel, 111 (2013) 411-421.
13. Li H., Liu X., Legros R., Bi X. T., Lim C. J., Sokhansanj S.; "Pelletization of torrefied sawdust and properties of torrefied pellets", Applied Energy 93 (2012) 680-685.
14. Larsson S. H., Rudolfsson M., Nordwaeger M., Olofsson I., Samuelsson R.; "Effects of moisture content, torrefaction temperature, and die temperature in pilot scale pelletizing of torrefied Norway spruce", Applied Energy 102 (2013) 827-832.
15. Peng J., Bi X. T., Lim C. J., Peng H., Kim C. S., Jia D., Zuo H.; "Sawdust as an effective binder for making torrefied pellets", Applied Energy 157 (2015) 491-498.
16. Araújo S. et. al.; "Effect of a mild torrefaction for production of eucalypt wood briquettes under different compression pressures", Biomass and Bioenergy, 90 (2016) 181-186.
17. Järvinen T., Agar D.; "Experimentally determined storage and handling properties of fuel pellets made from torrefied whole-tree pine chips, logging residues and beech stem wood", Fuel, 129 (2014) 330-339.
18. Hu Q., Shao J., Yang H., Yao D., Wang X., Chen H.; "Effects of binders on the properties of bio-char pellets", Applied Energy 157 (2015) 508-516.
19. Kong L., Tian S., Li Z., Luo R., Chen D., Tu Y., Xiong Y.; "Conversion of recycled sawdust into high HHV and low NOx emission bio-char pellets using lignin and calcium hydroxide blended binders", Renewable Energy 60 (2013) 559e565.
20. Zhong Q., Yang Y., Li Q., Xu B., Jiang T.; "Coal tar pitch and molasses blended binder for production of formed coal briquettes from high volatile coal", Fuel Processing Technology 157 (2017) 12-19.
21. Teixeira S. R., Pena A. F. V., Miguel A. G.; "Briquetting of charcoal from sugar-cane bagasse fly ash (scbfa) as an alternative fuel", Waste Management 30 (2010) 804-807.

22. Bhagwanrao S. V., Singaravelu M.; "Bulk density of biomass and particle density of their briquettes", Int. J. Agricultural Eng., Issue 1, 7 (2014) 221-224.
23. Kaliyan N., Vance Morey R.; "Factors affecting strength and durability of densified biomass products", Biomass and Bioenergy 33 (2009) 337-359
24. Bazargan A., Rough S. L., McKay G.; "Compaction of palm kernel shell biochars for application as solid fuel", Biomass and Bioenergy, 70 (2014) 489-497.
25. Temmerman M. et al; "Comparative study of durability test methods for pellets and briquettes", Biomass and Bioenergy 30 (2006) 964-972.
26. ISO 12510: Solid biofuels—Determination of mechanical durability of pellets and briquettes.
27. Kaliyan N., Vance Morey R.; "Natural binders and solid bridge type binding mechanisms in briquettes and pellets made from corn stover and switchgrass", Bioresource Technology 101 (2010) 1082-1090
28. J. S. Tumuluru & L. G. Tabil & Y. Song & K. L. Iroba; "Impact of process conditions on the density and durability of wheat, oat, canola, and barley straw briquettes", Bioenergy Research 8 (2015) 388-401.
29. Speight, J. G., Coal-fired power generation handbook. John Wiley & Sons: 2013.
30. Brown, T. R.; Thilakaratne, R.; Hu, G.; Brown, R. C., Techno-economic analysis of biomass to transportation fuels and electricity via fast pyrolysis and hydroprocessing. Fuel 2013, 106, 463-469.
31. Detels, R.; Tashkin, D. P.; Sayre, J. W.; Rokaw, S. N.; Massey Jr, F. J.; Coulson, A. H.; Wegman, D. H., The UCLA population studies of CORD: X. A cohort study of changes in respiratory function associated with chronic exposure to SOx, NOx, and hydrocarbons. American Journal of Public Health 1991, 81 (3), 350-359.
32. Costello, J.; Ortmeyer, C.; Morgan, W., Mortality from lung cancer in US coal miners. American journal of public health 1974, 64 (3), 222-224.
33. Ortmeyer, C. E.; Costello, J.; Morgan, W. K. C.; Sweeker, S.; Peterson, M., The mortality of Appalachian coal miners, 1963 to 1971. Archives of Environmental Health: An International Journal 1974, 29 (2), 67-72.
34. Palmer, M. A.; Bernhardt, E. S.; Schlesinger, W. H.; Eshleman, K. N.; Foufoula-Georgiou, E.; Hendryx, M. S.; Lemly, A. D.; Likens, G. E.; Loucks, O. L.; Power, M. E., Mountaintop mining consequences. Science 2010, 327 (5962), 148-149.
35. Falkowski, P.; Scholes, R.; Boyle, E.; Canadell, J.; Canfield, D.; Elser, J.; Gruber, N.; Hibbard, K.; Högberg, P.; Linder, S., The global carbon cycle: a test of our knowledge of earth as a system. science 2000, 290 (5490), 291-296.
36. Brown, R. C.; Brown, T. R., Why are We Producing Biofuels? Brownia LLC: 2012.
37. Brown, R. C.; Brown, T. R., Biorenewable Resources: Engineering New Products form Agriculture. 2 ed.; John Wiley & Sons Inc.: 2014.
38. Raveendran, K.; Ganesh, A., Heating value of biomass and biomass pyrolysis products. Fuel 1996, 75 (15), 1715-1720.
39. Cardona, C. A.; Sánchez, Ó. J., Fuel ethanol production: process design trends and integration opportunities. Bioresource technology 2007, 98 (12), 2415-2457.
40. Solomon, S., Climate change 2007—the physical science basis: Working group I contribution to the fourth assessment report of the IPCC. Cambridge University Press: 2007; Vol. 4.
41. Demirbaş, A., Biomass resource facilities and biomass conversion processing for fuels and chemicals. Energy conversion and Management 2001, 42 (11), 1357-1378.
42. Yaman, S., Pyrolysis of biomass to produce fuels and chemical feedstocks. Energy Conversion and Management 2004, 45 (5), 651-671
43. Outlook, A. E., Energy information administration. Department of Energy 2010, 92010 (9), 1-15.
44. Searcy, E. M.; Hess, J. R. Uniform-Format Feedstock Supply System: A Commodity-Scale Design to Produce an Infrastructure-Compatible Biocrude from Lignocellulosic Biomass; INL/EXT-10-20372; Idaho National Laboratory, USA: 2010.
45. Esau, K., Plant anatomy. Plant Anatomy. 1965, (2nd Edition).
46. Gori, S. S.; Raju, M. V. R.; Fonseca, D. A.; Satyavolu, J.; Burns, C. T.; Nantz, M. H., Isolation of C5-Sugars from the Hemicellulose-Rich Hydrolyzate of Distillers Dried Grains. ACS Sustainable Chemistry & Engineering 2015, 3 (10), 2452-2457.
47. Riera, F. A.; Alvarez, R.; Coca, J., Production of furfural by acid hydrolysis of corncobs. Journal of chemical technology and biotechnology 1991, 50 (2), 149-155.
48. Fonseca, D. A.; Lupitskyy, R.; Timmons, D.; Gupta, M.; Satyavolu, J., Towards integrated biorefinery from dried distillers grains: Selective extraction of pentoses using dilute acid hydrolysis. Biomass and Bioenergy 2014, 71, 178-186.

It will be understood that various details of the presently disclosed subject matter can be changed without departing from the scope of the subject matter disclosed herein. Furthermore, the foregoing description is for the purpose of illustration only, and not for the purpose of limitation.

What is claimed is:

1. A torrefied biomass briquette, comprising:
    (a) about 10% to about 95% of a highly-torrefied material (HTM) and about 5% to about 90% of a lightly torrefied material (LTM), wherein the LTM is torrefied at a temperature ranging from about 160° C. to about 220° C. and the HTM is torrefied at temperatures above about 240° C.; and
    (b) a torrefied acid hydrolyzed biomass having a FTIR profile comprising one or more reduced oxygen functionalities as compared to biomass not subjected to acid hydrolysis.
2. The briquette of claim 1, wherein, prior to forming the briquette, the HTM and the LTM have a combined moisture content of about 7% to about 15%.
3. The briquette of claim 1, wherein, subsequent to forming the briquette, the briquette has a moisture content of about 3% to about 10%.
4. The briquette of claim 1, wherein the briquette exhibits lignin based in-situ binding and is free of an added binder.
5. The briquette of claim 1, wherein the briquette has a density in the range of about 1 to about 1.5 $gm/cm^3$.
6. The briquette of claim 1, wherein the briquette has a durability index value of about 5% to more than about 90%.
7. The briquette of claim 1, wherein the briquette has a calorific value of about 8,000 BTU/lb to about 10,000 BTU/lb.
8. A method of producing a torrefied biomass briquette, comprising:
    mixing
    a) about 10% to about 95% of a highly-torrefied material (HTM) and about 5% to about 90% of a lightly torrefied material (LTM), wherein the LTM is torrefied at a temperature ranging from about 160° C. to about 220° C. and the HTM is torrefied at temperatures above about 240° C.; and, b) a torrefied acid hydrolyzed biomass having a FTIR profile comprising one or more reduced oxygen functionalities as compared to biomass not subjected to acid hydrolysis;

preheating the mixture to a predetermined temperature;

compressing and simultaneously heating the mixture, to thereby produce a torrefied biomass briquette.

9. The method of claim 8, wherein, prior to the compressing and heating, the HTM and the LTM have a combined moisture content of about 7% to about 15%.

10. The method of claim 8, wherein, subsequent to the compressing and heating, the briquette has a moisture content of about 3% to about 10%.

11. The method of claim 8, wherein the mixture is pre-heated to a temperature of about 40° C. to about 80° C.

12. The method of claim 8, further comprising the step of adjusting the moisture content of the mixture prior to compression.

13. The method of claim 8, wherein compressing and simultaneously heating the mixture comprises compressing and simultaneously heating the mixture in a die to a temperature of about 200° C. to about 250° C.

14. The method of claim 8, wherein the mixture does not include a binder.

* * * * *